United States Patent
Sesha et al.

(10) Patent No.: US 12,095,648 B2
(45) Date of Patent: Sep. 17, 2024

(54) ROUTING TABLE ANOMALY DETECTION USING UNSUPERVISED MACHINE LEARNING

(71) Applicant: HEWLETT PACKARD ENTERPRISE DEVELOPMENT LP, Houston, TX (US)

(72) Inventors: Madhusoodhana Chari Sesha, Bangalore (IN); Ankit Kumar Sinha, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 374 days.

(21) Appl. No.: 17/500,896

(22) Filed: Oct. 13, 2021

(65) Prior Publication Data

US 2023/0113462 A1  Apr. 13, 2023

(51) Int. Cl.
*H04L 45/02* (2022.01)
*G06N 20/00* (2019.01)
*H04L 45/745* (2022.01)

(52) U.S. Cl.
CPC ............. *H04L 45/08* (2013.01); *G06N 20/00* (2019.01); *H04L 45/745* (2013.01)

(58) Field of Classification Search
CPC ....... H04L 45/08; H04L 45/745; G06N 20/00; G06N 5/01; G06N 20/10; G06N 20/01
See application file for complete search history.

(56) References Cited

U.S. PATENT DOCUMENTS

| | | | |
|---|---|---|---|
| 8,418,249 B1* | 4/2013 | Nucci | G06F 21/552 |
| | | | 709/225 |
| 9,967,178 B1* | 5/2018 | K S | H04L 45/38 |
| 2020/0067935 A1* | 2/2020 | Carnes, III | H04L 63/101 |
| 2020/0145287 A1* | 5/2020 | Savalle | H04L 43/04 |
| 2020/0382430 A1* | 12/2020 | Hughes | H04L 47/2483 |
| 2021/0250228 A1* | 8/2021 | Prakash | H04L 41/0893 |

FOREIGN PATENT DOCUMENTS

| | | | | |
|---|---|---|---|---|
| GB | 2609258 A * | 2/2023 | | H04L 45/02 |
| WO | WO-2004015933 A1 * | 2/2004 | | H04L 69/16 |
| WO | WO-2021171384 A1 * | 9/2021 | | G06N 3/0475 |

* cited by examiner

*Primary Examiner* — Thu V Nguyen
*Assistant Examiner* — Ranjan Pant
(74) *Attorney, Agent, or Firm* — Sheppard Mullin Richter & Hampton LLP

(57) ABSTRACT

Systems and methods are provided for detecting changes in network activity that are depicted in a routing table. The routing table may be stored as a search tree data structure (e.g., Merkle Patricia Tree) to mimic a standard routing table and reduce the search time to find the desired route by allowing the router to traverse the search tree data structure more efficiently. Additionally, the metadata of the tree may be provided to an unstructured machine learning model (e.g., K-means) to identify new clusters of routes week-over-week and generate an alert with any changes. Changes are identified in near real time and dynamically at the router (not a central device) to reduce the time needed to respond to network changes.

20 Claims, 7 Drawing Sheets

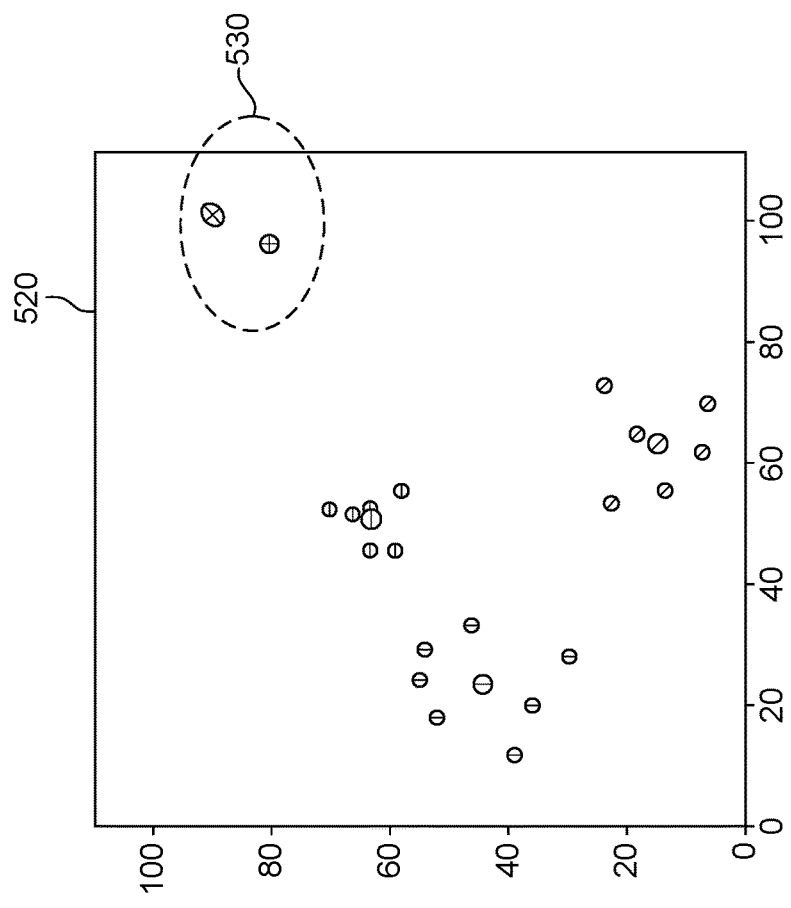
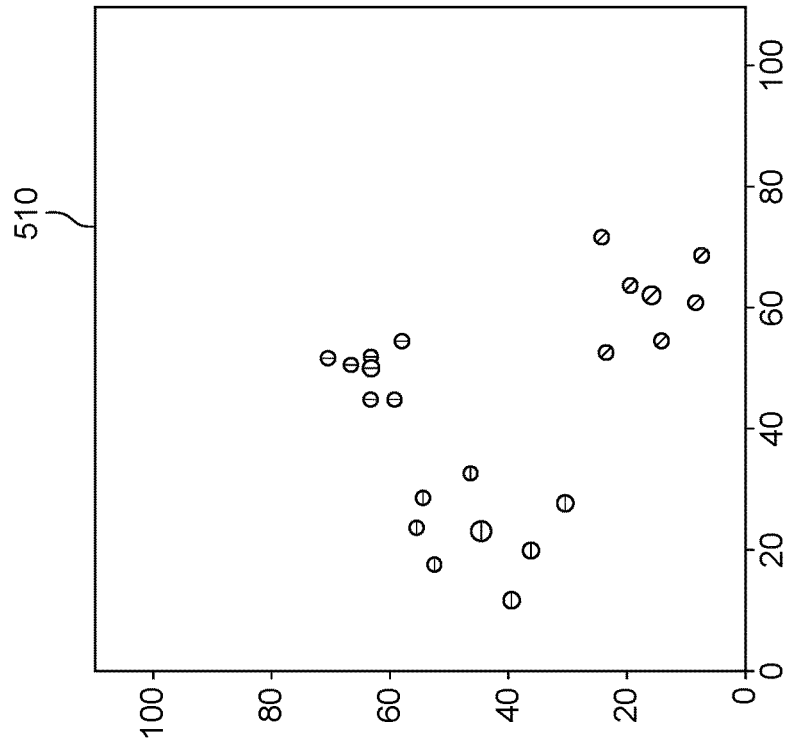
FIG. 5

ROUTING TABLE ANOMALY DETECTION USING UNSUPERVISED MACHINE LEARNING

BACKGROUND

A router is a networking device that forwards data packets between computer networks. The data packet includes address information in a header portion of the data packet. The router will receive the data packet and determine where the data packet will be sent (e.g., the destination IP address) based on matching the address information from the data packet with address information in a routing table.

The routing table comprises a set of rules that are used to determine where data packets traveling over an Internet Protocol (IP) network will be directed. Each entry in the routing table may comprise a network identifier or destination corresponding to the route, a subnet mask used to match a destination IP address to the network identifier, the next hop IP address to which the data packet is forwarded, outgoing interface corresponding with the location that the data packet should be directed in order to reach the destination network, and other information.

BRIEF DESCRIPTION OF THE DRAWINGS

The present disclosure, in accordance with one or more various examples, is described in detail with reference to the following figures. The figures are provided for purposes of illustration only and merely depict typical or examples.

FIG. 5 illustrates anomaly detection in accordance with one or more examples of the disclosure.

Figure 1:
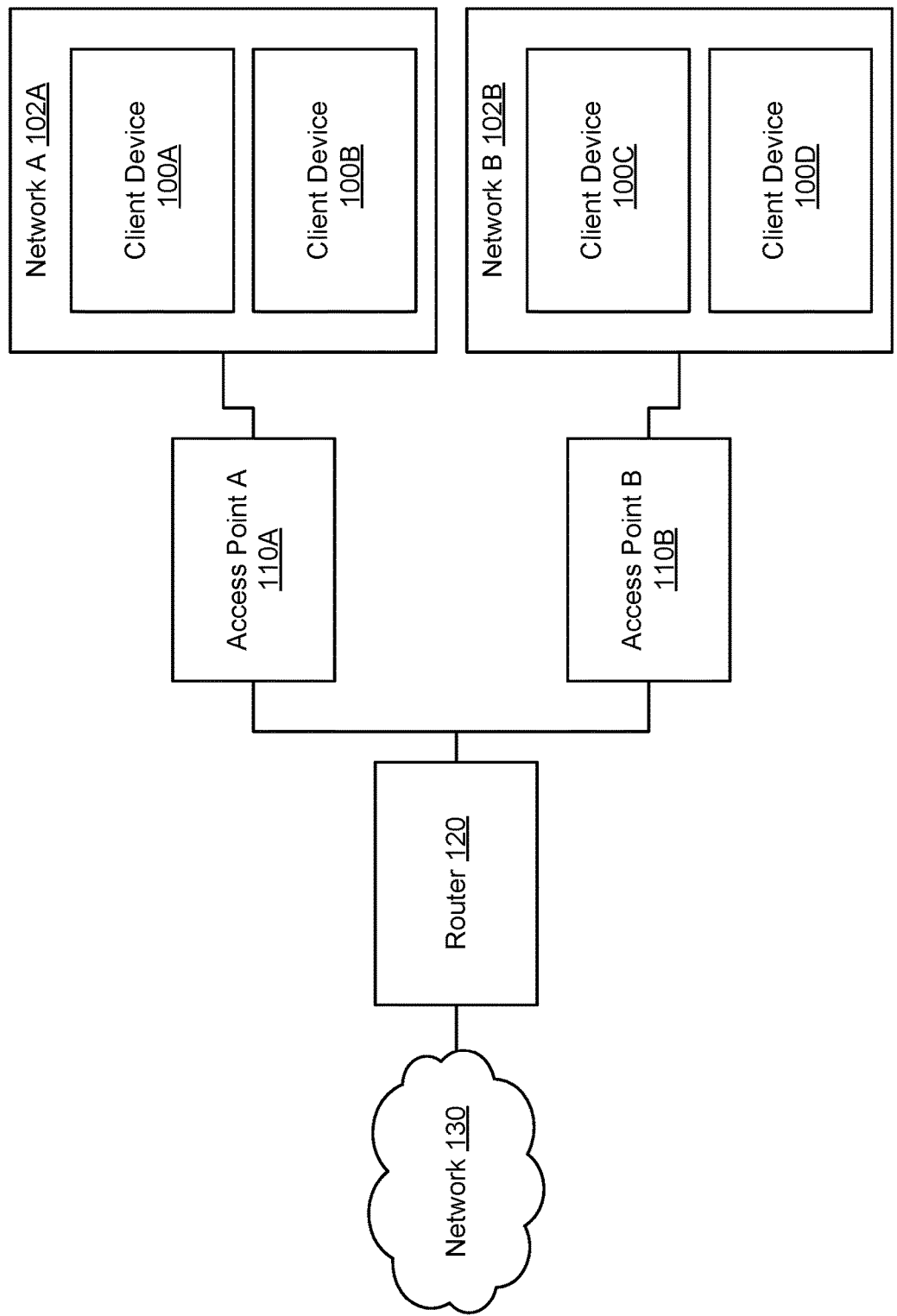
FIG. 1 illustrates a computer environment in accordance with one or more examples of the disclosure.

The figures are not exhaustive and do not limit the present disclosure to the precise form disclosed.

DETAILED DESCRIPTION

Traditional routers use routing tables to determine where to send a data packet, based on all networks for which routes are known. The routing tables may be maintained using static routing or dynamic routing. In static routing, a network administrator manually updates and changes the routing table. In dynamic routing, the router itself can build and maintain its routing table automatically by using routing protocols to exchange information about surrounding network topology. This may include updating the routing table based on a device failure or network congestion.

When a data packet arrives at the router, the router may determine the address information from the data packet and search the routing table for a match. When a match is found, the router may determine where to transmit the data packet as its next hop. However, when routing tables become large, the search process becomes resource intensive and inefficient. This is especially true when there are multiple nodes or complex paths in distributed networks connected by the router.

Additionally, internet security associated with packet routing can be improved. For example, general network deployment includes manual setups of L1 connectivity, L2 and L3 protocols, Security, QoS, etc. But for L3, internal routes may fall into subnet ranges or prefixes that do not change often. When internet routes are imported, the update process may vary in terms of subnet ranges or prefixes, but will generally stay constant until more drastic updates are received. Such a drastic update may correspond with a malicious event and are often difficult to detect without closely watching changes in the network.

Examples of the disclosure can replace the standard routing table with a search tree data structure (e.g., Merkle Patricia Tree). The search tree data structure may mimic a routing table and reduce the search time to find the desired route by allowing the router to traverse the search tree data structure more efficiently. Additionally, the metadata of the tree may be provided to an unstructured machine learning model (e.g., K-means) to identify new clusters of routes week-over-week (e.g., aggregated address information) and generate an alert with any changes. Changes are identified in near real time and dynamically at the router (not a central device) to reduce the time needed to respond to network changes.

Technical improvements are described throughout the disclosure. For example, when routing tables become large, the search process to find where to send a received packet becomes resource intensive and inefficient. This is especially true when there are multiple nodes or complex paths in distributed networks connected by the router. Examples of the disclosure can improve the data structure implemented in the system by using a search tree data structure and reduce the search time to find the desired route. This may allow the router to traverse the search tree data structure more efficiently and quickly send the data packet to its next device along the path.

Before describing examples of the disclosed systems and methods in detail, it is useful to describe an example network installation with which these systems and methods might be implemented in various applications. FIG. 1 illustrates a computer environment in accordance with one or more examples of the disclosure. The computer environment may include one or more networks 102 (illustrated as first network 102A and second network 102B), one or more access points 110 (illustrated as first access point 110A and second access point 110B), router 120, and external network 130 (e.g., Internet).

Networks 102 may comprise one or more computing components that transmit data packets to other computing components within the same network or in other networks. Each of the computing components may comprise a hardware processor (e.g., central processing units (CPUs), semiconductor-based microprocessors, or any other processing circuitry) for retrieval and execution of instructions stored in machine-readable storage medium. The hardware processor may fetch, decode, and execute instructions to control processes or operations for transmitting data packets.

Router 120 is a network device that receives and sends data packets on the network. Router 120 may be a gateway between two networks at Open Systems Interconnection Model (OSI) layer 3 and that relays and directs data packets through that inter-network (e.g., compliant with IEEE 802.11 standard). In some examples, router 120 includes a firewall, virtual private network (VPN), or any other computer devices capable of routing traffic.

Wireless access points (APs) 110 provide network connectivity to various client devices 100. Using a connection to AP 110, a client device 100 may access network resources, including other devices on first network 102A and second network 102B. Each of APs 110 may be a combination of hardware, software, and/or firmware that is configured to provide network connectivity to wireless client devices from each network 102. APs 110 can be managed and configured by the controller.

The components of each network 102 may include client devices 100 (illustrated as first client device 100A, second client device 100B, third client device 100C, fourth client device 100D) which can correspond with desktop computers, laptop computers, servers, or other network device. Each client device 100 can include a controller (e.g., network interface controller (NIC) or other hardware chip that can enable client device 100 to connect to other devices on the network and enable communication between client devices 100). Each network 102 may include multiple client devices 100. In some examples, the controller of client device 100A may enable communication across networks, including from client device 100A, to network A 102A, to access point A 110A through router 120 and back to the second network (e.g., via access point B 110B, network B 102B, and client device 100C). Other devices may implement controllers as well (e.g., switches, routers, access points, and other network devices connected to a network). The controller may itself be, or provide the functionality of, an access point.

Client devices in first network 102A can communicate with client devices in second network by transmitting one or more packets via APs 110, router 120, and other devices described herein. As such, client devices at first network 102A access the network resources at first network 102A and second network 102B as if these client devices were located there. In such examples, second network 102B is managed by a controller, and the controller provides the necessary connectivity, security, and accessibility that enable communication between the networks.

Network 130 may be a public or private network, such as the Internet, or other communication network to allow connectivity among the various networks 102. Network 130 may include third-party telecommunication lines, such as phone lines, broadcast coaxial cable, fiber optic cables, satellite communications, or cellular communications. Network 130 may include any number of intermediate network devices, such as switches, routers, gateways, servers, and/or controllers, which are not directly part of the network configuration but that facilitate communication between the various parts of the network configuration, and between the network configuration and other network-connected entities.

In traditional computing environments, a data packet may originate with first network 102A with an intended recipient client device in second network 102B. The packet may be transmitted from first network 102A, via first AP 110A, and received at router 120. One routing table entry may exist for each of the service providers domain name servers (DNS) and one entry for routing among all local or home devices (e.g., address information). The routing may also comprise a few additional routes for multicast and broadcast routes. Router 120 may identify the destination address for the packet and look up destination port in the routing table. The lookup process may be slow, as each entry is searched sequentially, which technically allows the very last entry to be a match between the destination address and the route identified in the routing table. Router may identify second AP 110B as the next top and direct the packet transmission to the port corresponding with AP 110B, and then to second network 102B.

Figure 2:
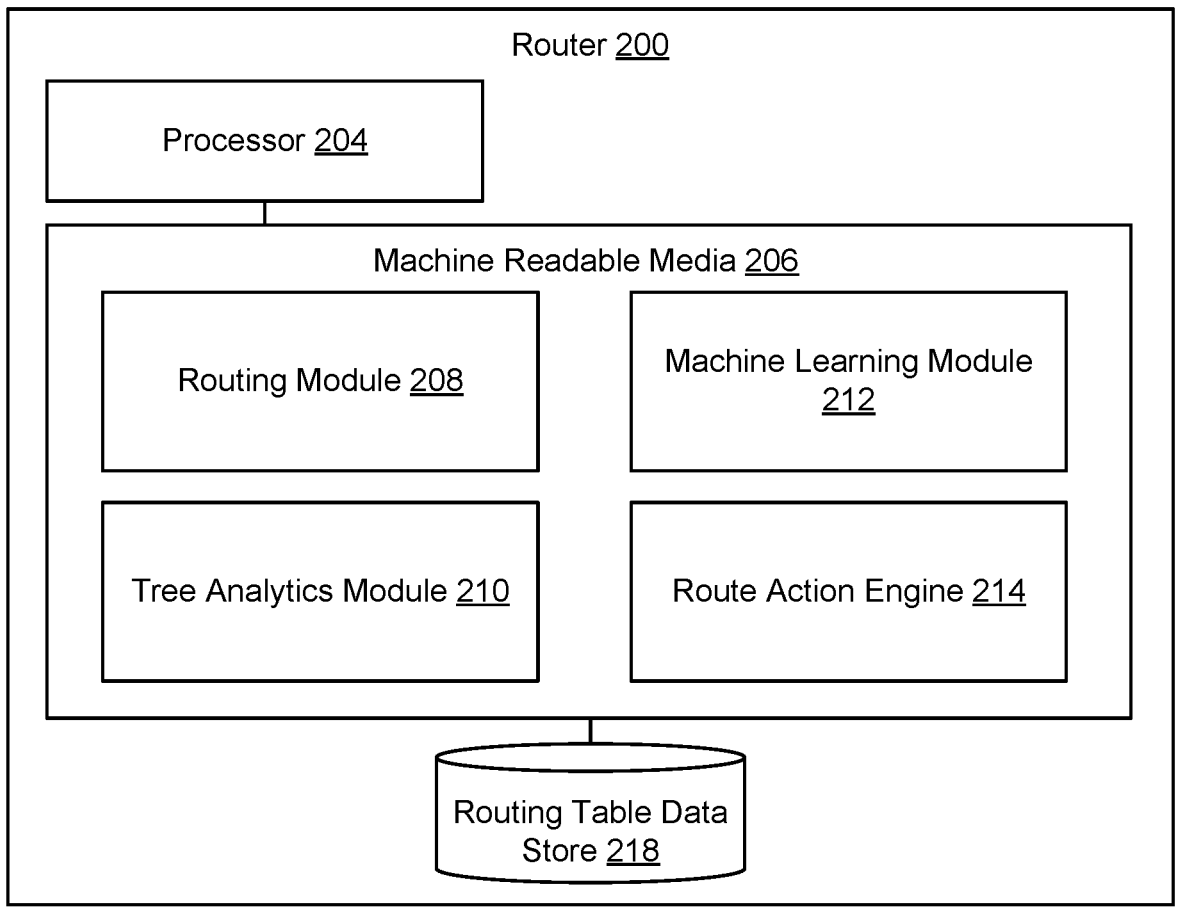
FIG. 2 illustrates a router in accordance with one or more examples of the disclosure.

In examples of the current disclosure, router 120 may be implemented as router 200 as being consistent with current disclosure and illustrated in FIG. 2. Using router 200, the data packet may originate with first network 102A that is intended for second network 102B. The data packet may be routed to its destination based on a path determined from a search tree.

Router 200 can generate a search tree (e.g., using routing module 208) for searching for data packet destinations where all entries of the tree (e.g., address information from multiple data packets) may not be visited during the search. Rather, the search time may be reduced. In some examples, search time is considerably reduced when only a portion of the search tree and the search is restricted from visiting the remaining portions of the search tree. This may occur because one path of the search tree may correspond with a subset of values (e.g., a destination IP address between 100-199) and a second path of the search tree may correspond with a second and non-overlapping subset of values (e.g., a destination IP address between 200-299). As such, the data packet may not be included in both subsets, so only half of the possible routes may be searched. When the data packet arrives at router 200, the destination information is be identified and the data packet can be routed accordingly. Router 200 may also analyze the destination information to identify anomalous behavior in the aggregate and perform one or more actions in response to identifying the anomalous behavior. The anomalous behavior can be identified in comparing the information included in a populated search tree and packet header information from data packets, and identifying any differences between the search tree and the received aggregated address information from the data packets. This is because most routing information should not change frequently. By identifying differences between the search tree and the packet information, the differences can be identified and an alert can be generated to research further.

Router 200 comprises processor 204, machine readable media 206, and routing table data store 218. Machine readable media 206 may comprise one or more modules and engines, including routing module 208, tree analytics module 210, machine learning module 212, and route action engine 214.

Processor 204 may be one or more central processing units (CPUs), semiconductor-based microprocessors, and/or other hardware devices suitable for retrieval and execution of instructions stored in machine-readable storage medium 206. Processor 204 may fetch, decode, and execute instructions to control processes or operations for implementing routing table anomaly detection using unsupervised machine learning. As an alternative or in addition to retrieving and executing instructions, processor 204 may include one or more electronic circuits that include electronic components for performing the functionality of one or more instructions, such as a field programmable gate array (FPGA), application specific integrated circuit (ASIC), or other electronic circuits.

Machine readable media 206 may be any electronic, magnetic, optical, or other physical storage device that contains or stores executable instructions corresponding with one or more modules and engines, including routing module 208, tree analytics module 210, machine learning module 212, and route action engine 214. Machine readable media 206 may be, for example, Random Access Memory (RAM), non-volatile RAM (NVRAM), an Electrically Erasable Programmable Read-Only Memory (EEPROM), a storage device, an optical disc, and the like. In some examples, machine readable media 206 may be a non-transitory storage medium, where the term "non-transitory" does not encompass transitory propagating signals.

Routing module 208 is configured to receive one or more data packets, determine a destination address for each of the one or more data packets, and initiate a transmission of the one or more data packets to a second device and/or hop using the search tree in a replacement of the routing table. For example, when a routing table is used, routing module 208 may search each entry consecutively, one-by-one, until the correct entry is found to match the destination IP address. When the search tree is used, routing module 208 may search a first portion of the entries and skip a second portion of the entries, as described herein. The routing definitions may be stored in routing table data store 218.

In some examples, routing module 208 can generate the search tree. For example, when router 200 receives the data packet from first network 102A, routing module 208 reads the destination IP address in the packet header. Routing module 208 can parse the destination IP address into a subset of the IP address (e.g., the first three values or "100" of IP address "100.0.1.0"). Routing module 208 can compare the entries of the first row of the search tree to see if any nodes match the subset of the IP address. If so, routing module 208 can follow the path in the search tree to find the end of the search tree, matching the nodes along the way. The leaf node may identify which port the packet will be sent in accordance with the matching nodes in the search tree. If there is no match, routing module 208 may build and maintain the search tree by using routing protocols to exchange information about the surrounding network topology from other network devices or an administrative user.

Routing module 208 may also be configured to store metadata and/or other routing table data in routing table data store 218 (e.g., flat file, comma separated values (CSV) file, database, or other storage media). Various formats of the data may be stored, for example, a routing table and/or a search tree, or other data structure. In some examples when a search tree is generated, routing table data store 218 may comprise a trie depth (e.g., a type of search tree where the data structure trie is traversed depth-first, following the links between nodes, and other data stored in the structure), number or type of nodes, and number of leaf nodes.

This information may be collected by routing module 208 or an administrative user at a some time frame (e.g., each hour). Routing table data store 218 may also include address information associated with routing the data packet, including a timestamp (e.g., arrival of the data packet at router 200), network identifier of the subnet and/or netmask, gateway, header (e.g., origin and destination IP address, or IPv4 packet header data), or address of the next device along the path to that destination (e.g., next hop).

Figure 3:
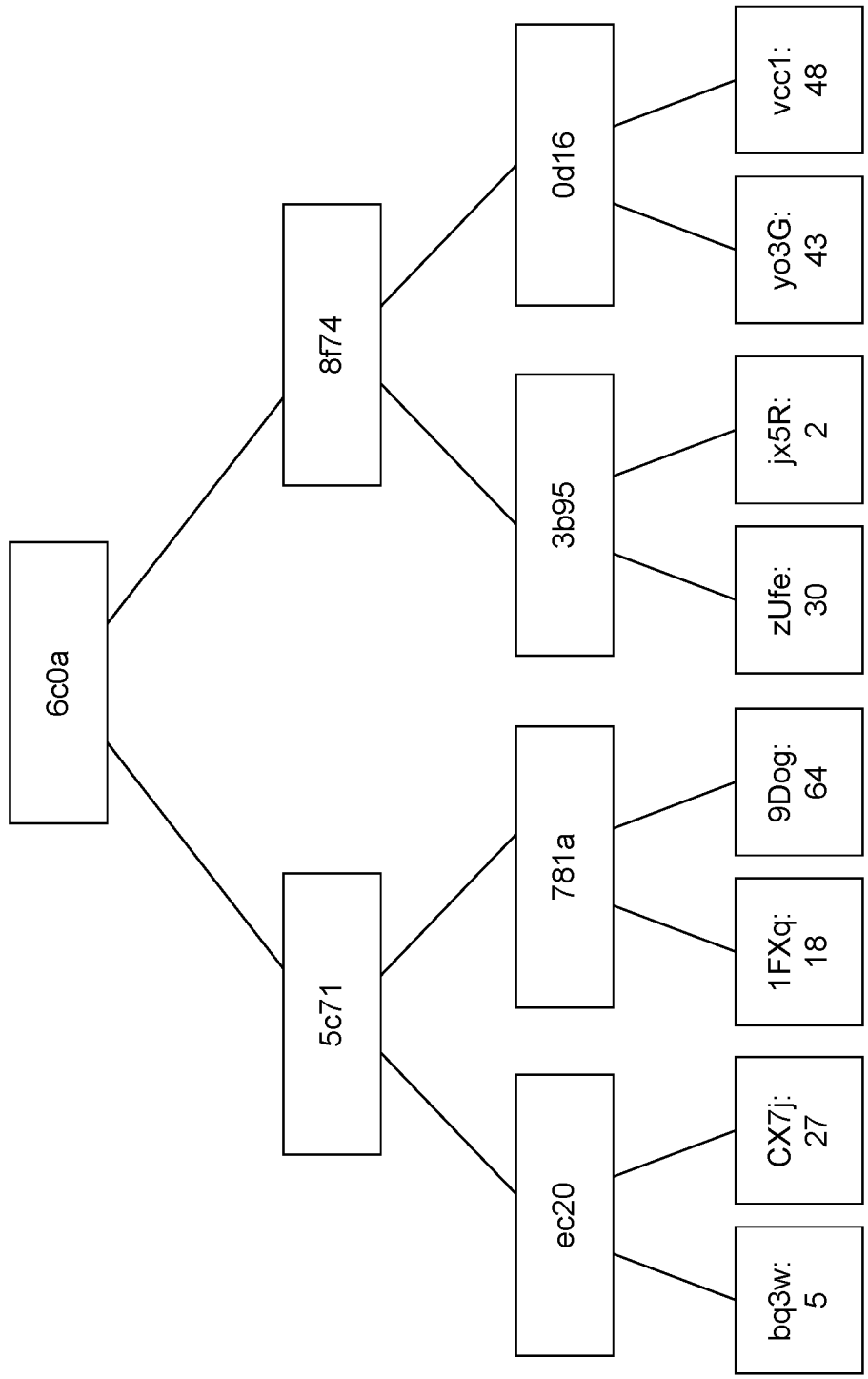
FIG. 3 illustrates a search tree in accordance with one or more examples of the disclosure.

Routing table may be stored in various formats. For example, the routing table data may be stored as a binary search tree (BST), balanced tree, Patricia trie (or Radix tree, prefix tree, each used interchangeably), Merkle-Patricia tree, or other data structure format. The Patricia trie may comprise a space-optimized trie in which each node that is the only child is merged with its parent. The number of children of every internal node is at most the radix r, where r is a positive integer and a power x of 2, having x≥1. The Merkle-Patricia tree may comprise every node of a tree of a hash value (e.g., where each hash is also used as a key for that refers to the node) as illustrated in FIG. 3. Data associated with the Merkle-Patricia tree may be stored in routing table data store 218.

A hash function is a function that can be used to map data of an arbitrary size to fixed-size values. The values returned by a hash function are called hash values or hashes. The hash values can be used to index a fixed-size table called a hash table or hash tree. The hash tree (or hash trie) is a persistent data structure that stores the hashes of its keys, regarded as strings of bits, in the trie, with the actual keys and values stored at the trie's "final" or leaf nodes.

Each search tree includes various types of nodes. The top node or root node is the start state and the set of children for each node consists of states reachable by taking any action, called search nodes. The final node in each path is called a leaf node.

The value stored in routing table data store 218 may correspond with the content of node while the key may be the hash of the node. As such, actual keys may not be explicitly stored in routing table data store 218, but rather the hash function to calculate the key or the hash value of the key. In some examples, routing module 208 may perform one full key comparison on the indexed record to confirm a match.

Tree analytics module 210 is configured to analyze properties of the routing table stored in routing table data store 218. The tree properties may include, for example, trie depth, number and/or type of nodes, and number of leaf nodes. Using these properties, tree analytics module 210 may detect changes in the routing table and/or search tree. For example, when the number of leaf nodes increases more than a first threshold value, the change may be flagged as a significant change. In another example, when the trie depth increases more than a second threshold value, the change may be flagged as a significant change. In these examples, the analytics of the structure of the tree avoid analytics of route prefixes (e.g., stored with parent node data).

Figure 4:
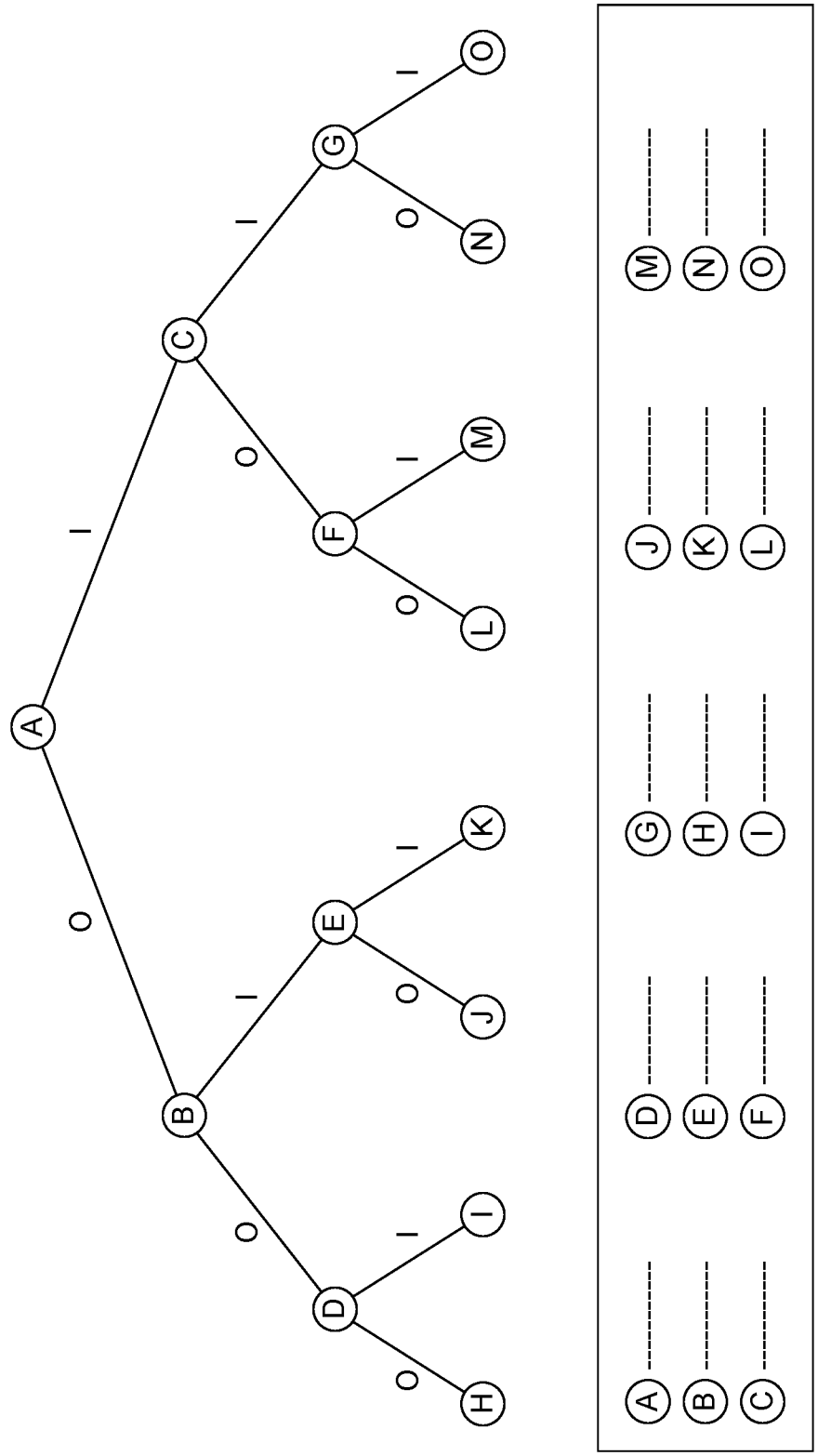
FIG. 4 illustrates a search tree in accordance with one or more examples of the disclosure.

As an illustrative example, FIG. 4 provides a search tree in accordance with one or more examples of the disclosure. In this example, the trie depth is 3, the number of nodes is 15, and the number of leaf nodes is 8. The leaf nodes may also represent a number of preferred routes (e.g., longest prefix routes).

Tree analytics module 210 may initiate an analysis process on a predetermined schedule or time frame (e.g., every hour or every day based on a determination by an administrative user) to retrieve training data for a machine learning (ML) model. The training data may correspond with a previous time frame when a data anomaly was not detected and act as a baseline for training the ML model. The training and use of the ML model may be performed by machine learning module 212, as described further herein.

As an illustrative example, at the end of every hour, routing module 208 may collect values and store it in routing table data store 218. The data may be aggregated for a predetermined time range (e.g., a week) and provided as input to the ML model (e.g., unsupervised learning model). The ML model may be trained using this aggregated data to determine the baseline of the network. In this manner, tree analytics module 210 can provide new header data to the trained ML model and identify any changes that occur in the network during the second time range. When new header data is identified (e.g., by the comparison or by providing the data to the trained ML model), tree analytics module 210 may restrict anomalous behavior from the normal functioning of the network (e.g., by comparing data from a first predetermined time period to data from a second predetermined time period).

Machine learning module 212 is configured to use the training data set to train the machine learning (ML) model through unsupervised learning. For example, unsupervised learning may not provide any pre-assigned labels or scores for the training data and instead may self-discover any naturally occurring patterns in that training data set. This may include clustering, where machine learning module 212 may group training examples into categories with similar features. The clusters may be compressed by identifying which features are most useful for discriminating between different training examples and/or may discard the rest.

As an illustrative example, the trained ML model may include a root node as "1" with sub-nodes as "0" or "1" such that a first incoming data packet "100.1.1.1" can be directed along a first path in the search of the tree and a second incoming data packet "110.1.1.1" can be directed along a second path in the search of the tree. A third incoming data packet "200.1.1.1" may not match any existing paths in the existing search tree. The unsupervised ML model may create a new cluster corresponding with the third incoming data packet, such that the corresponding search tree includes two root nodes as "1" and "2."

Various methods may be implemented in the unsupervised machine learning process to determine the new clusters corresponding with data path nodes. In some examples, the unsupervised learning of the ML model may correspond with a K-means or flat clustering algorithm. For example, the K-means clustering algorithm may compute centroids of each data cluster and iterate the process until it finds an optimal centroid of each cluster. In some examples, the number of clusters may already be known and the centroid may correspond with a known cluster. The centroid values may not vary greatly in the routing table data.

In some examples, the ML model may use the elbow method to determine the number of clusters in the data set. The elbow method may consist of plotting any variation as a function of the number of clusters and picking the elbow of the curve as the number of clusters to use. The same method can be used to choose the number of parameters in other data-driven models, such as the number of principal components to describe a data set.

Using the trained ML model, values in routing table data store 218 (e.g., hourly values) may be provided as input to the trained ML model with the optimal centroid of each cluster. As discussed herein, on a predetermined schedule (e.g., at the end of the week), the data collected on the predetermined schedule may be provided as input to the ML model and used to update the trained ML model.

Once clusters are populated with the new routes and/or route updates, the data received at routing table data store 218 may be classified into one of the existing clusters. If routes are not classified within available cluster or the data point is not within a threshold distance of the centroid of one of the existing clusters, the data point may form a new cluster. Any new clusters may initiate an alert notification process (by route action engine 214) as further defined herein.

FIG. 5 illustrates anomaly detection in accordance with one or more examples of the disclosure. In this illustration, first cluster 510 and second cluster 520 may illustrate data packet routes stored in routing table data store 218 and clustered by machine learning module 212. First cluster 510 may correspond with a first predetermined time range (e.g., a first week) and second cluster 520 may correspond with a second predetermined time range (e.g., a second week).

Additional routing table changes may be added each time range. When the routing table data does not fit the learned pattern of route table changes, the routing table data may form a new cluster 530. This indicates that the overall structure of the tree (e.g., the Merkle tree, routing table, or other search tree) has departed from the normal behavior of the network. When comparing the two clusters, new cluster 530 appears across the predetermined time range with several routing data associated with the centroid of the cluster 530.

The identification of new cluster 530 may initiate an action by route action engine 214. For example, route action engine 214 is configured to generate the alert notification. The alert notification may identify that there are one or more changes have occurred in the routing table and an administrative user may review the routing table data for more information, including specific destination IP addresses that were added to the search tree since the previous time range or the source of the data packets. The changes may or may not correspond with anomalous behavior in an effort to increase network security. For example, the changes may correspond with anomalous behavior when a bad actor attempts to hijack the data packets and transmit them to a new computer network (e.g., corresponding with new cluster 530 or a new node in the search tree). The changes may not correspond with anomalous behavior when a new subnetwork is added by an administrative user (e.g., corresponding with a new building or computing lab on a campus).

Route action engine 214 is also configured to determine any routes corresponding with new cluster 530 and automatically reroute them to a second analysis module prior to transmitting the data packets to the second network. The second analysis module may be a local action performed by an administrative user and/or client device to analyze the data and determine whether the activity is anomalous. For example, the administrative user may identify the sender device that provided the data packets to the new destination or manually review the content of the data packets to determine if there is malware included with the data packet.

In another example, the routing action associated with the route change may include activating a monitor mode at router 200 for the future data packets. The monitor mode may identify any future data packets that may correlate with new cluster 530 and tag routing data associated with these packets for further review, analysis, or monitoring. In some examples, monitor mode, or RFMON (Radio Frequency MONitor) mode, allows router 200 with its network interface controller (NIC) to monitor all traffic received on a wireless channel.

When the destination routes are moving from first cluster 510 and/or second cluster 520 to new cluster 530, route action engine 214 may automatically determine that the activity is anomalous by including machine-readable instructions or rules to automatically determine any new clusters are anomalous. For example, the action may include replacing the current destination routing information with a preprogrammed route to overwrite the received routing data. In another example, the action may include removing the routes corresponding with new cluster 530 from the routing table.

In another example, route action engine 214 may implement an Access Control List (ACL) to define routing instructions for the data packets. The ACL may implement a packet filter of the network to restrict, permit, or deny the route traffic for future data packets that are received by router 200.

The ACL may control the flow of packets for a single or group of IP address or different for protocols, such as Transmission Control Protocol (TCP), User Datagram Protocol (UDP), Internet Control Message Protocol (ICMP), and the like.

It should be noted that the terms "optimize," "optimal" and the like as used herein may be used to mean making or achieving performance as effective or perfect as possible. However, as one of ordinary skill in the art reading this document will recognize, perfection cannot always be achieved. Accordingly, these terms may also encompass making or achieving performance as good or effective as possible or practical under the given circumstances, or making or achieving performance better than that which may be achieved with other settings or parameters.

Figure 6:
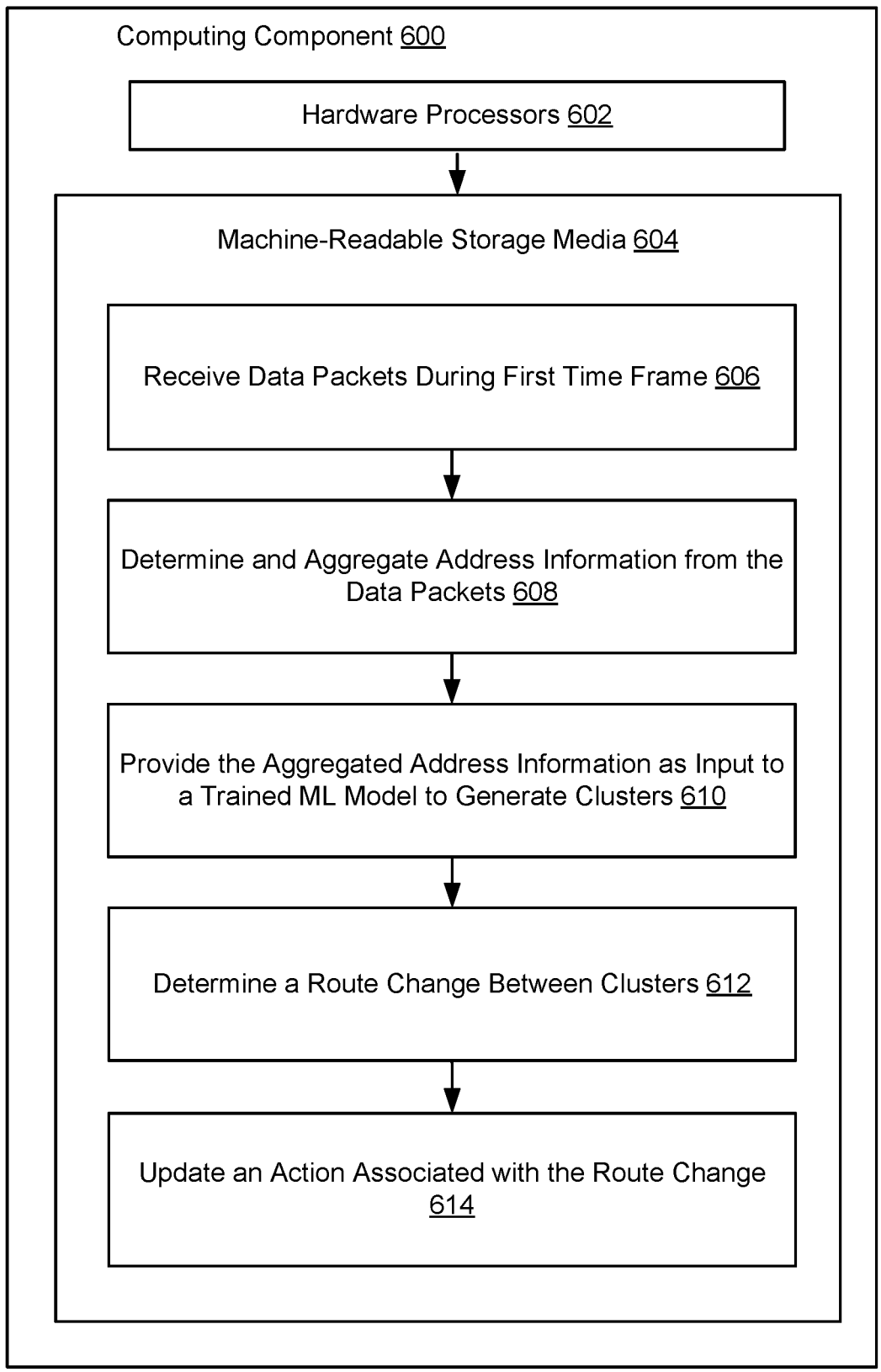
FIG. 6 is an example computing component that may be used to implement various features of examples described in the present disclosure.

FIG. 6 illustrates an example computing component that may be used to implement routing table anomaly detection using unsupervised machine learning in accordance with various examples. Referring now to FIG. 6, computing component 600 may be, for example, a server computer, a controller, or any other similar computing component capable of processing data. In the example implementation of FIG. 6, the computing component 600 includes a hardware processor 602, and machine-readable storage medium for 604.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-614, to control processes or operations for routing table anomaly detection using unsupervised machine learning. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-614.

Hardware processor 602 may execute instruction 606 to receive data packets during a first time frame. For example, hardware processor 602 may receive multiple data packets during a first predetermined time frame.

Hardware processor 602 may execute instruction 608 to determine and aggregate address information from the data packets. For example, hardware processor 602 may determine and aggregate address information from the multiple data packets, where the multiple data packets include a first data packet and a second data packet. The address information may be aggregated based on similarities between the address information found in the first data packet and the second data packet.

Hardware processor 602 may execute instruction 610 to provide the aggregated address information as input to a trained ML model to generate clusters. For example, hardware processor 602 may provide the aggregated address information as input to a trained machine learning model, where the trained machine learning model generates first clusters associated with the aggregated address information for the first predetermined time frame.

Hardware processor 602 may execute instruction 612 to determine a route change between clusters. For example, hardware processor 602 may determine a route change by comparing the first clusters for the first predetermined time frame with second clusters for a second predetermined time frame.

Hardware processor 602 may execute instruction 614 to update a routing action associated with the route change. For example, hardware processor 602 may update a routing action associated with the route change, where future data packets are routed based on the routing action.

In some examples, computing component 600 is a router.

In some examples, the address information in the multiple data packets is used to update a routing table for the computing device.

In some examples, hardware processor 602 may execute an instruction to dynamically generate a routing table; and store the routing table as a search tree data structure.

In some examples, the second clusters are determined using second aggregated address information as second input to the trained machine learning model.

In some examples, the trained machine learning model uses a K-means algorithm to identify clusters of routes corresponding with the aggregated address information.

In some examples, the trained machine learning model uses an elbow method to identify clusters of routes corresponding with the aggregated address information.

In some examples, the routing action associated with the route change is to reroute the future data packets using an access control list (ACL).

In some examples, the routing action associated with the route change is to activate a monitor mode at the computing device for the future data packets.

Figure 7:
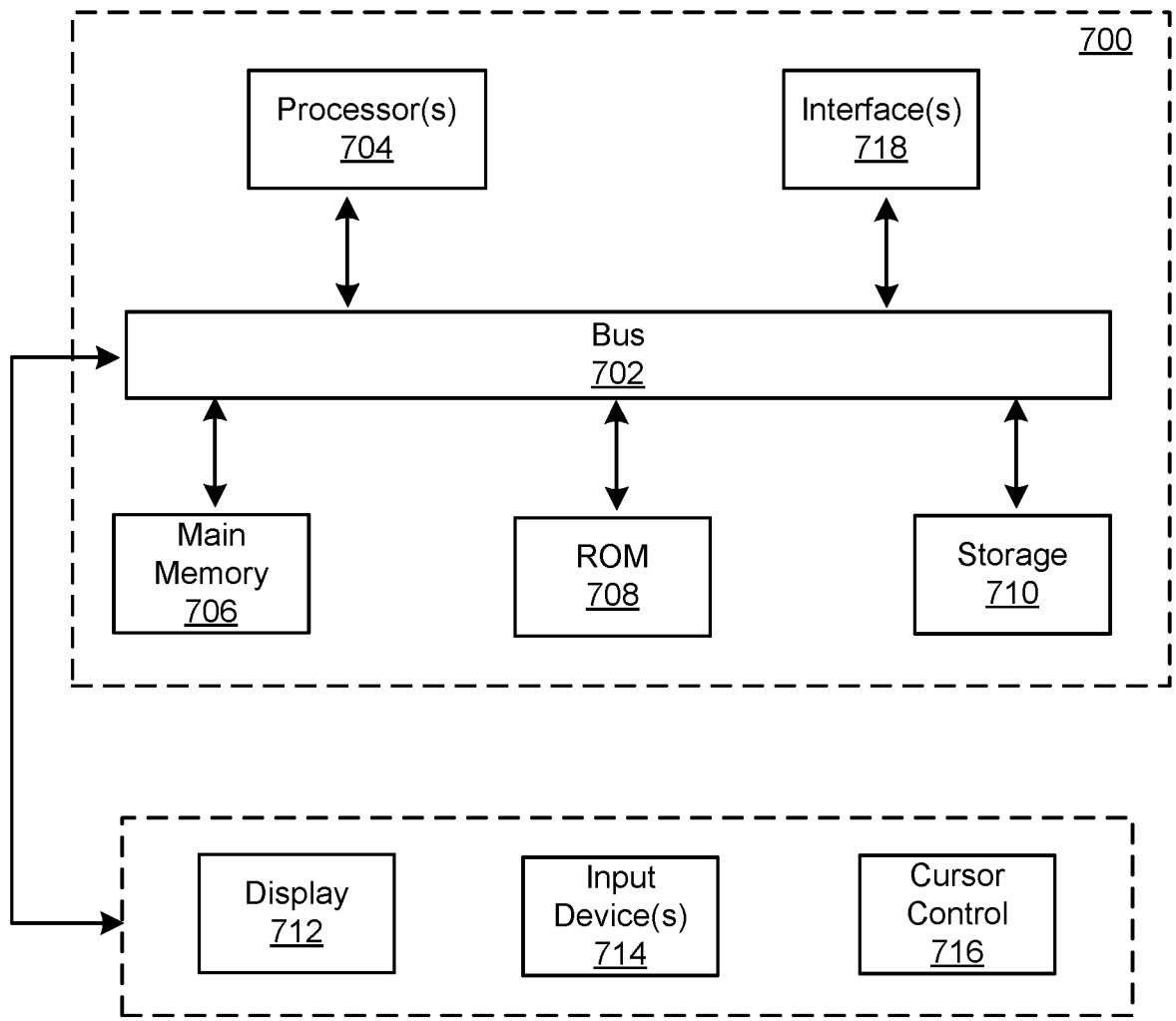
FIG. 7 depicts a block diagram of an example computer system in which various of the examples described herein may be implemented.

FIG. 7 depicts a block diagram of an example computer system 700 in which various of the examples described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some examples, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media may also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 may send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto may be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described may be shared in part or in total among one or more circuits. Even though various features or elements of functionality may be individually described or claimed as separate circuits, these features and functionality may be shared among one or more common circuits, and such description shall not require or imply that separate circuits are required to implement such features or functionality. Where a circuit is implemented in whole or in part using software, such software may be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing device comprising:
  a memory; and
  one or more processors that are configured to execute machine readable instructions stored in the memory for performing a method comprising:
    receive multiple data packets during a first time frame;
    determine address information from the multiple data packets, wherein the multiple data packets include a first data packet and a second data packet;
    aggregate the address information from the first data packet and the second data packet based on similarities between the address information found in the first data packet and the second data packet;
    provide the aggregated address information as input to a trained, unsupervised machine learning model, wherein the trained, unsupervised machine learning model generates first clusters associated with the aggregated address information for the first time frame, the first clusters identifying data path nodes that transmitted the first data packet and the second data packet;
    determine a route change by comparing the first clusters for the first time frame with second clusters for a second time frame that are also generated by the trained, unsupervised machine learning model;
    update an action associated with the route change, wherein future data packets are routed based on the action;
    dynamically generate a routing table; and
    store the routing table as a search tree data structure.

2. The computing device of claim 1, wherein the computing device is a router.

3. The computing device of claim 1, further comprising:
  updating a routing table for the computing device with the address information in the multiple data packets.

4. The computing device of claim 1, wherein the second clusters are determined using second aggregated address information as second input to the trained machine learning model.

5. The computing device of claim 1, wherein the trained machine learning model uses a K-means algorithm to identify clusters of routes corresponding with the aggregated address information.

6. The computing device of claim 1, wherein the trained machine learning model uses an elbow method to identify clusters of routes corresponding with the aggregated address information.

7. The computing device of claim 1, wherein the action associated with the route change is to reroute the future data packets using an access control list (ACL).

8. The computing device of claim 1, wherein the action associated with the route change is to activate a monitor mode at the computing device for the future data packets.

9. A computer-implemented method comprising:
  receiving, by a computing device, multiple data packets during a first time frame;
  determining, by the computing device, address information from the multiple data packets, wherein the multiple data packets include a first data packet and a second data packet;
  aggregating the address information from the first data packet and the second data packet based on similarities between the address information found in the first data packet and the second data packet;
  providing, by the computing device, the aggregated address information as input to a trained, unsupervised machine learning model, wherein the trained, unsupervised machine learning model generates first clusters associated with the aggregated address information for the first time frame, the first clusters identifying data path nodes that transmitted the first data packet and the second data packet,
- wherein the aggregation identifies multiple data packets that were transmitted along a common route along the data path nodes during the first time frame, and wherein the common route along the data path nodes is identified from a search tree data structure;
- determining, by the computing device, a route change by comparing the first clusters for the first time frame with second clusters for a second time frame that are also generated by the trained, unsupervised machine learning model; and
- updating, by the computing device, an action associated with the route change, wherein future data packets are routed based on the action.

10. The computer-implemented method of claim 9, wherein the computing device is a router.

11. The computer-implemented method of claim 9, the method further comprising:
- updating a routing table for the computing device with the address information in the multiple data packets.

12. The computer-implemented method of claim 9, the method further comprising:
- dynamically generating a routing table; and
- storing the routing table as a search tree data structure.

13. The computer-implemented method of claim 9, wherein the second clusters are determined using second aggregated address information as second input to the trained machine learning model.

14. The computer-implemented method of claim 9, wherein the trained machine learning model uses a K-means algorithm to identify clusters of routes corresponding with the aggregated address information.

15. The computer-implemented method of claim 9, wherein the trained machine learning model uses an elbow method to identify clusters of routes corresponding with the aggregated address information.

16. The computer-implemented method of claim 9, wherein the routing action associated with the route change is to reroute the future data packets using an access control list (ACL).

17. The computer-implemented method of claim 9, wherein the routing action associated with the route change is to activate a monitor mode at the computing device for the future data packets.

18. A non-transitory computer-readable storage medium storing a plurality of instructions executable by one or more processors, the plurality of instructions when executed by the one or more processors cause the one or more processors to:
- receive multiple data packets during a first time frame;
- determine and aggregate address information from the multiple data packets, wherein the multiple data packets include a first data packet and a second data packet;
- aggregate the address information from the first data packet and the second data packet based on similarities between the address information found in the first data packet and the second data packet;
- provide the aggregated address information as input to a trained, unsupervised machine learning model, wherein the trained, unsupervised machine learning model generates first clusters associated with the aggregated address information for the first predetermined time frame, the first clusters identifying data path nodes that transmitted the first data packet and the second data packet,
- wherein the aggregation identifies multiple data packets that were transmitted along a common route along the data path nodes during the first time frame, and wherein the common route along the data path nodes is identified from a search tree data structure;
- determine a route change by comparing the first clusters for the first time frame with second clusters for a second time frame that are also generated by the trained, unsupervised machine learning model; and
- update a routing action associated with the route change, wherein future data packets are routed based on the routing action.

19. The computer-readable storage medium of claim 18, the one or more processors further to:
- dynamically generate a routing table; and
- store the routing table as a search tree data structure.

20. The computer-readable storage medium of claim 19, the one or more processors further to:
- update the routing table with the address information in the multiple data packets.

* * * * *